(12) United States Patent
Lynam

(10) Patent No.: US 8,346,581 B2
(45) Date of Patent: Jan. 1, 2013

(54) PROJECT TIMELINE VISUALIZATION METHODS AND SYSTEMS

(75) Inventor: Jeff Ronald Lynam, Roanoke, VA (US)

(73) Assignee: Exelis, Inc., McLean, VA (US)

( * ) Notice: Subject to any disclaimer, the term of this patent is extended or adjusted under 35 U.S.C. 154(b) by 587 days.

(21) Appl. No.: 12/334,652

(22) Filed: Dec. 15, 2008

(65) Prior Publication Data

US 2010/0153159 A1 Jun. 17, 2010

(51) Int. Cl.
*G06Q 30/00* (2006.01)
(52) U.S. Cl. ............... 705/7; 705/8; 705/9; 705/10
(58) Field of Classification Search .............. 705/7, 8, 705/9, 10
See application file for complete search history.

(56) References Cited

U.S. PATENT DOCUMENTS

| | | | |
|---|---|---|---|
| 7,761,288 B2* | 7/2010 | Parnell et al. ............... | 704/2 |
| 2003/0066032 A1 | 4/2003 | Ramachandran et al. | |
| 2004/0117768 A1 | 6/2004 | Chang et al. | |
| 2005/0222881 A1* | 10/2005 | Booker ............. | 705/7 |
| 2006/0044307 A1 | 3/2006 | Song | |
| 2006/0095457 A1 | 5/2006 | Glasspool et al. | |
| 2006/0200372 A1* | 9/2006 | O'Cull et al. ............. | 705/8 |
| 2008/0127195 A1* | 5/2008 | Buchner .............. | 718/104 |
| 2008/0221946 A1* | 9/2008 | Balon ............... | 705/7 |

OTHER PUBLICATIONS

Authorized Officer Nathalie Abadie, International Search Report and the Written Opinion of the International Searching Authority of PCT/US2009/063051, European Patent Office, Feb. 3, 2010.

* cited by examiner

*Primary Examiner* — Nga B. Nguyen
(74) *Attorney, Agent, or Firm* — RatnerPrestia

(57) ABSTRACT

Methods, systems, and computer readable storage mediums for presenting project information are disclosed. Project information may be presented by receiving electronic planning information associated with a project, where the received electronic planning information includes at least one milestone associated with two or more phases of the project and occurring during the two or more phases. The received electronic planning information is then transformed into a graphical representation of the received electronic planning information for visual presentation to a user and presented for perception by the user. The presented graphical representation includes two or more bars corresponding to the two or more phases and a connection between the two or more bars corresponding to a time at which the milestone occurs.

20 Claims, 2 Drawing Sheets

PROJECT TIMELINE VISUALIZATION METHODS AND SYSTEMS

BACKGROUND OF THE INVENTION

Gantt charts are bar charts that use horizontal bars to represent project schedules as a function of time. Different phases of a project may be represented on a Gantt chart by different bars. In tracking a project's schedule it may be useful to know how each phase of a project interrelates to other phases of a project. Traditional Gantt charts do not provide such information. Accordingly, there is a need for improved methods for displaying project information.

SUMMARY OF THE INVENTION

Aspects of the present invention are embodied in methods, systems, and computer readable storage mediums for presenting project information. Project information may be presented by receiving electronic planning information associated with a project, where the received electronic planning information includes at least one milestone associated with two or more phases of the project and occurring during the two or more phases. The received electronic planning information is then transformed is into a graphical representation of the received electronic planning information for visual presentation to a user and presented for perception by the user. The presented graphical representation includes two or more bars corresponding to the two or more phases and a connection between the two or more bars corresponding to a time at which the milestone occurs.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings may not be drawn to scale. On the contrary, the dimensions of the various features may be are arbitrarily expanded or reduced for clarity. Included in the drawings are the following figures.

DETAILED DESCRIPTION OF THE INVENTION

Figure 1:
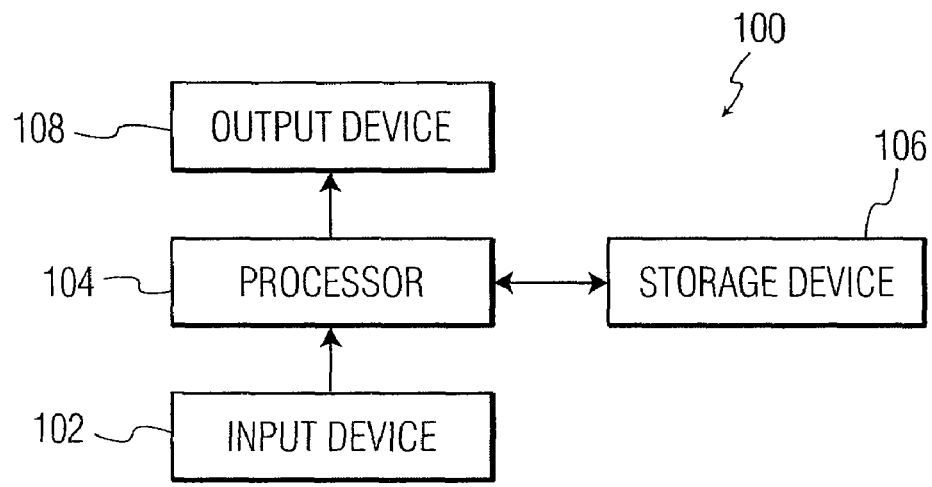
FIG. 1 is a block diagram depicting an exemplary system for presenting information associated with a project in accordance with an aspect of the present invention.

FIG. 1 depicts an exemplary system 100 for presenting information associated with a project in accordance with one aspect of the present invention. Exemplary projects may include, by way of non-limiting example: software development projects, construction projects, mechanical device development projects, electronic device development projects, and landscaping or architectural projects. The project information may include, for example, project phases, project schedules, or resource data associated with the project. Project phases may be different steps or sub-projects which should/must be completed in order to complete the project. The project phases may include milestones within each phase. As used herein, the term milestone means an important event or achievement occurring during a project phase. Milestones included in the project information may correspond to multiple project phases. The resource data may include, for example, costs, personnel, or other resources associated with the project or project phase.

As a general overview, system 100 includes input device 102, processor 104, storage device 106, and output device 108. Additional details of system 100 are provided below.

Input device 102 receives input from the user and provides electronic data to processor 104. The electronic data may include project information. In an exemplary embodiment, input device 102 may be a keyboard, mouse, or other computer peripheral device capable of receiving input from an external source. Input of the planning information may be facilitated through the use of a graphical user interface (GUI) presented on output device 108, for example, including data entry boxes and/or drop down menus for receiving input from input device 102. A suitable GUI for use with the present invention will be understood by one of skill in the art from the description herein.

Processor 104 receives electronic data from input device 102 and transforms that electronic data into a graphical representation for visual presentation to a user. Processor 104 may store received electronic data in storage device 106 (described below). In an exemplary embodiment, processor 104 may generate a graphical representation of project information included in the electronic data. The graphical representation may include two or more bars that vary as a function of time. The bars may correspond to different projects or to different phases of the same project. The graphical representation may further include a connection between the two or more bars corresponding to a milestone shared by those phases or projects. The connection may take the form of two or more bars intersecting, or may take the form of a connecting line connecting the two or more bars. Processor 104 may then provide the graphical representation to the output device 108 (described below). A suitable processor for use with the present invention will be understood by one skilled in the art from the description herein.

Storage device 106 stores electronic data received from processor 104. In an exemplary embodiment, processor 104 may receive project information from input device 102 and may transmit project information and/or a graphical representation of the project information to storage device 106 for storage. Processor 104 may access stored project information in order to generate a graphical representation of the project information and/or access the stored graphical representation. A suitable storage device for use with the present invention will be understood by one skilled in the art from the description herein.

Output device 108 receives electronic data from processor 104 and outputs the data for visual presentation to a user. The electronic data may include graphical representations of project information. In an exemplary embodiment, output device 108 may be a computer display, printer, or other computer peripheral device capable of generating output from received electronic data for visual presentation to a user.

Figure 2:
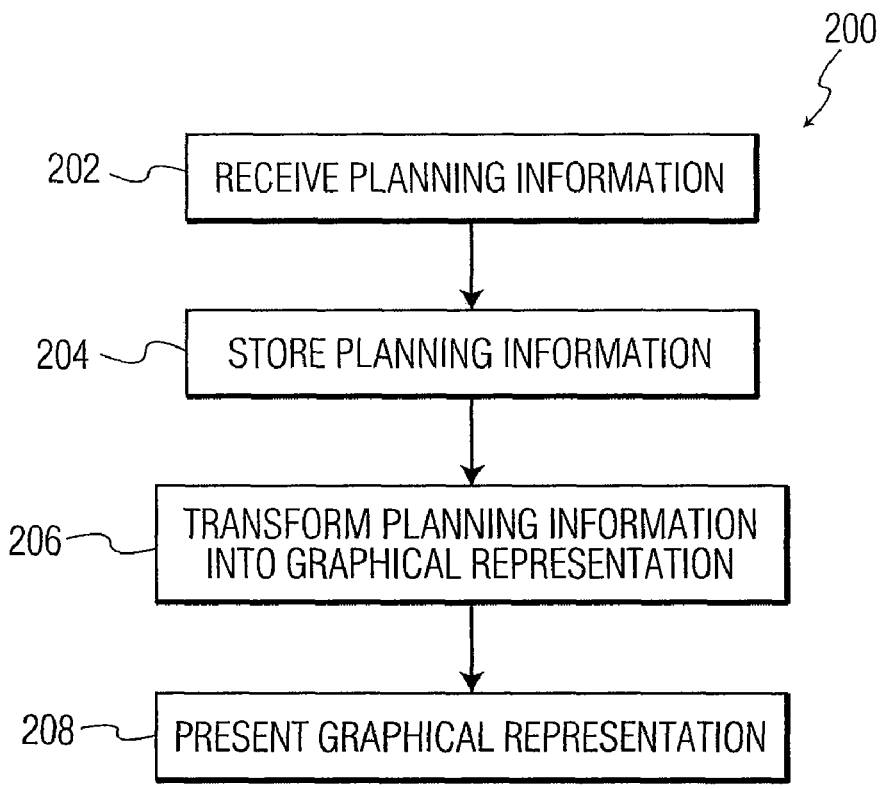
FIG. 2 is a flow chart of exemplary steps for presenting information associated with a project in accordance with an aspect of the present invention.

FIG. 2 is a flow chart 200 depicting exemplary steps for presenting information associated with a project in accordance with one aspect of the present invention. To facilitate description, the steps of FIG. 2 are described with reference to the system components of FIG. 1. It will be understood by one of skill in the art from the description herein that one or more steps may be omitted and/or different components may be utilized without departing from the spirit and scope of the present invention.

In step 202, planning information is received. In an exemplary embodiment, planning information associated with a project may be received by processor 104 from input device 102. Exemplary planning information may include, for example, project phases, project schedules, or resource data associated with the project. The project phases may include milestones within each phase. The milestones included in the is planning information may correspond to multiple project phases. Input of the planning information may be facilitated through the use of a graphical user interface (GUI) including data entry boxes and/or drop down menus. A suitable GUI for use with the present invention will be understood by one of skill in the art from the description herein.

In step 204, the received planning information is stored. In an exemplary embodiment, processor 104 may store the planning information in storage device 106.

In step 206, the planning information is transformed into a graphical representation for visual presentation to a user. In an exemplary embodiment, processor 104 may generate a graphical representation from the planning information associated with a project. Processor 104 may generate the information from the stored planning information or from the received planning information. The graphical representation may include two or more bars that vary as a function of time. The bars may correspond to different projects or to different phases of the same project. The graphical representation may further include a connection between the two or more bars corresponding to a milestone shared by those phases or projects. The connection may take the form of two or more bars intersecting, or may take the form of a connecting line connecting the two or more bars. For example, two phases sharing a project milestone may have bars which intersect at the point in time when the milestone is to be reached.

In step 208, the graphical representation is presented for perception by a user. In an exemplary embodiment, processor 104 may transmit the graphical representation to output device 108. Output device 108 may then present the graphical representation to the user. For example, the graphical representation may be displayed on a visual display device such as a monitor or printed on a piece of paper using a printer.

Figure 3:
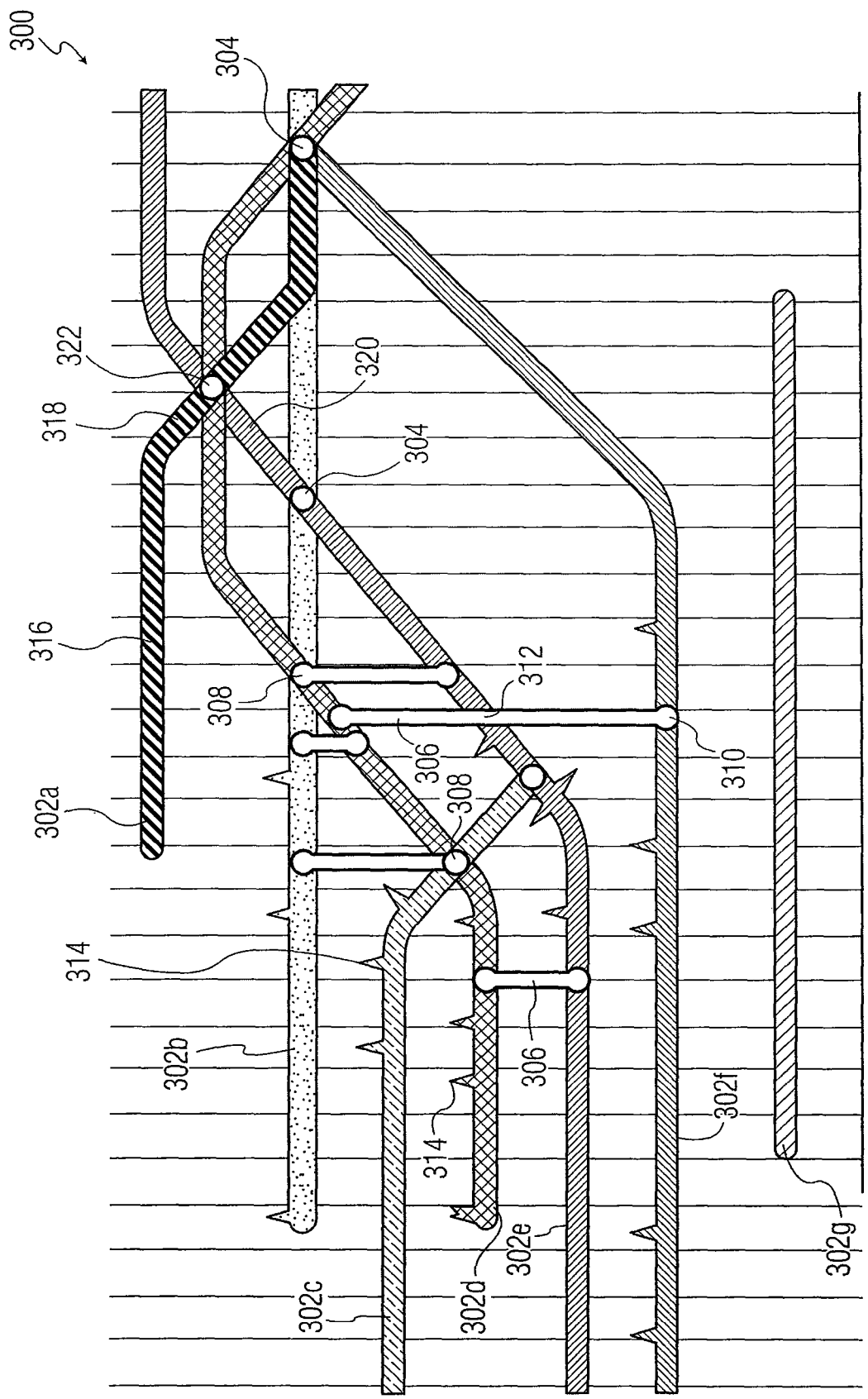
FIG. 3 is a project information chart in accordance with an aspect of the present invention.

FIG. 3 depicts an exemplary graphical representation 300 of project information for presentation to a user in accordance with one aspect of the present invention. The graphical representation depicts seven bars 302*a-g*. Each bar 302*a-g* may correspond to a scheduled phase of a project and the length of the bar may correspond to the time allotted to complete that phase.

Each phase of the project may have one or more milestones associated with it. In an exemplary embodiment, milestones may be associated with one or more phases of the project. Milestones may be presented as symbols located on the bar corresponding to the associated project. For example, a milestone associated with only one phase may be presented as a spike 314 protruding from the bar. A milestone associated with two or more phases may be presented as a connection between the two or more bars corresponding to each phase. A connection between two or more bars may take the form of: the two or more bars intersecting, e.g., connection 304; a milestone line intersecting the two or more bars, e.g., connection 306; or a combination of bars intersecting and milestone lines intersecting, e.g., connection 308.

An intersection corresponding to a milestone may be presented by using a symbol 310 where two bars having a common milestone cross or where a milestone line and a bar cross. If no intersection is meant to be presented where a bar and a milestone line cross, the symbol is not used, as shown in location 312. The milestone line may extend along an axis corresponding to the time at which the milestone occurs.

In use, a first bar 302*a*, representing a first phase associated with a project, may have a first straight portion 316 extending in a first direction and a second straight portion 318 extending in a second direction. A second bar 302*e*, representing a second phase associated with a project, may have a third straight portion 320 extending in a third direction. A milestone associated with both phases may then be represented by an intersection 322 between the second straight portion 318 and the third straight portion 320.

One or more of the steps described above may be embodied in computer-executable instructions stored on a computer readable storage medium for configuring a general purpose computer to present project information. The computer readable storage medium may be essentially any tangible storage medium capable of storing instructions for performance by a computer such as an optical disc, magnetic disk, or solid state device, for example. Alternatively, the computer-executable instructions may be embodied in a specific purpose computer for presenting project information.

Although the invention is illustrated and described herein with reference to specific embodiments, the invention is not intended to be limited to the details shown. Rather, various modifications may be made in the details within the scope and range is of equivalents of the claims and without departing from the invention.

What is claimed is:

1. A method for presenting project information comprising the steps of:
   receiving electronic planning information associated with a project, the received electronic planning information including at least one milestone, the at least one milestone associated with two or more phases of the project and occurring during the two or more phases;
   transforming the received electronic planning information with a processor into a graphical representation of the received electronic planning information for visual presentation to a user; and
   presenting the graphical representation of the received electronic planning information for perception by the user, the presented graphical representation including two or more bars corresponding to the two or more phases and a connection between the two or more bars corresponding to the at least one milestone shared by the two or more phases of the project.

2. The method of claim 1, wherein the two or more bars of the presented graphical representation intersect to form the connection corresponding to the at least one milestone.

3. The method of claim 2, wherein the two or more bars include a first bar, the first bar including a first straight portion extending in a first direction and a second straight portion extending in a second direction different from the first direction.

4. The method of claim 3, wherein the two or more bars include a second bar, the second bar including a third straight portion extending in a third direction.

5. The method of claim 4, wherein the second straight portion of the first bar and the third straight portion of the second bar intersect to form the connection.

6. The method of claim 2, wherein the presented graphical representation further includes a symbol corresponding to the milestone located at the intersection of the two or more bars.

7. The method of claim 1, wherein the presented graphical representation further includes a connecting line intersecting the two or more bars to form the connection corresponding to the at least one milestone.

8. The method of claim 7, wherein the connecting line extends along an axis corresponding to the time at which the milestone occurs.

9. The method of claim 7, wherein the presented graphical representation further includes a symbol corresponding to the milestone located at the intersections of the connecting line and the two or more bars.

10. The method of claim 1, wherein the presenting step comprises the step of: displaying the graphical representation on a visual display.

11. The method of claim 1, wherein the transforming step comprises the step of: transforming, by a computer processor, the received electronic planning information into the graphical representation.

12. The method of claim 11, wherein the receiving step comprises the step of: receiving, by the computer processor, the electronic planning information.

13. A system for presenting project information comprising:
- an input device for receiving electronic planning information associated with a project, the received electronic planning information including at least one milestone, the at least one milestone associated with two or more phases of the project and occurring during the two or more phases;
- a processor for transforming the received electronic planning information into a graphical representation of the received electronic planning information for visual presentation to a user; and
- an output device for presenting the graphical representation of the received electronic planning information for perception by the user, the presented graphical representation including two or more bars corresponding to the two or more phases and a connection between the two or more bars corresponding to the at least one milestone shared by the two or more phases of the project.

14. The system of claim 13, wherein the output device for presenting comprises: a visual display device for displaying the graphical representation on a visual display.

15. The system of claim 13, wherein the processor for transforming comprises: a device for transforming, by a computer processor, the received electronic planning information into the graphical representation.

16. The system of claim 15, wherein the input device for receiving comprises: a graphical user interface for receiving, by the computer processor, the electronic planning information.

17. A computer readable storage medium having computer-executable instructions for presenting project information, the computer-executable instructions for performing operations comprising: receiving electronic planning information associated with a project, the received electronic planning information including at least one milestone, the at least one milestone associated with two or more phases of the project and occurring during the two or more phases; transforming the received electronic planning information into a graphical representation of the received electronic planning information for visual presentation to a user; and presenting the graphical representation of the received electronic planning information for perception by the user, the presented graphical representation including two or more bars corresponding to the two or more phases and a connection between the two or more bars corresponding to the at least one milestone shared by the two or more phases of the project.

18. The computer readable storage medium of claim 17, wherein the presenting operation comprises: displaying the graphical representation on a visual display.

19. The computer readable storage medium of claim 17, wherein the transforming operation comprises: transforming, by a computer processor, the received electronic planning information into the graphical representation.

20. The computer readable storage medium of claim 19, wherein the receiving operation comprises: receiving, by the computer processor, the electronic planning information.

* * * * *